United States Patent [19]

Castellano et al.

[11] E Re. 28,504

[45] Reissued Aug. 5, 1975

[54] CARTRIDGE-LOADED SOUND MOTION PICTURE PROJECTION

[75] Inventors: Peter J. Castellano, Deer Park; Jerry H. Galuten, Elmhurst, both of N.Y.

[73] Assignee: Audio-Optics Corporation, New York, N.Y.

[22] Filed: Apr. 24, 1974

[21] Appl. No.: 463,698

Related U.S. Patent Documents

Reissue of:

[64] Patent No.: 3,778,137
Issued: Dec. 11, 1973
Appl. No.: 292,116
Filed: Sept. 25, 1972

U.S. Applications:

[62] Division of Ser. No. 65,869, Aug. 21, 1970.

[52] U.S. Cl. ..... 352/72; 242/55.19 A; 352/239

[51] Int. Cl.[2] ..... G03B 23/02

[58] Field of Search..... 242/55.19 A; 352/72, 78 R, 352/128, 233, 221, 224, 239

[56] References Cited

UNITED STATES PATENTS

| | | | |
|---|---|---|---|
| 3,033,074 | 5/1962 | Schaefer | 352/224 |
| 3,176,310 | 3/1965 | Finnerty | 352/72 X |
| 3,212,837 | 10/1965 | Beyer | 352/72 |
| 3,278,252 | 10/1966 | Wagner et al. | 352/78 R X |
| 3,305,296 | 2/1967 | Nicosia | 352/78 R X |

FOREIGN PATENTS OR APPLICATIONS

| | | | |
|---|---|---|---|
| 15,357 | 4/1912 | France | 352/239 |

*Primary Examiner*—Fred L. Braun
*Attorney, Agent, or Firm*—Dressler, Goldsmith, Clement & Gordon, Ltd.

[57] ABSTRACT

A cartridge containing an endless loop of motion picture film is inserted into a projector having a shutter, a frame advancing claw and a resiliently mounted drive pinion. The [cartirdge] *cartridge* includes a drive wheel mounted in an opening therein which cooperates with the drive pinion of the projector for continuously advancing the film mounted in the opening. The resiliently mounted drive pinion is positioned in the projector so that it is beyond the dead center position of the drive wheel when the cartridge is fully inserted into the projector for holding the same in place.

10 Claims, 6 Drawing Figures

CARTRIDGE-LOADED SOUND MOTION PICTURE PROJECTION

Matter enclosed in heavy brackets [ ] appears in the original patent but forms no part of this reissue specification; matter printed in italics indicates the additions made by reissue.

---

The present application is a division of our prior copending U.S. Pat. application Ser. No. 65,869, filed Aug. 21, 1970.

The present invention relates to cartridge-loaded motion picture projectors and particularly to projectors for dislaying both motion pictures and sound coordinated therewith. The essence of the invention is the film and the way it is handled.

A practical cartridge-loaded sound motion picture projector requires a combination of many features, the main one being as follows.

First, a cartridge of practical size must contain a considerable length of film with coordinated sound and the individual pictures must be of sufficient size for efficient projection. Moreover, the film must always move in one direction. This requires a combination of structures not present in film used heretofore.

Second, the cartridge must be easily and reliably insertable and withdrawable at any time with both sound and picture functioning without the need to frame the picture and without endangering the film in the cartridge.

It is also desirable to minimize the size and complexity of the projector and to employ cartridges of minimum complexity and maximum reliability and these are further criterion of significance to the invention.

In accordance with the invention, the film is employed in a cartridge with the film moving continuously in one direction and with the film including at least two horizontally extending rows of pictures, at least one row on the upper half of the film, and at least one row on the lower half of the film, said rows being symmetrically positioned with respect to the axis of the film. Each row of pictures is provided with its own associated magnetic sound track, the sound track for one row of pictures being on one side of the film and the sound track for the other row of pictures being on the opposite side of the film and the entire strip of film having its opposite ends secured together with one end of the film being rotated with respect to the other so that, where the film ends come together, the rows of pictures are on opposite sides of the film and the magnetic sound tracks come together on the same side of the film. As a result, the two rows of pictures and the two sound tracks merge and form a single continuous sound motion picture presentation.

In preferred practice, the number and size of the pictures which can be stored on a strip of film of given width and length is further maximized by first having the pictures placed on the film side by side, with the vertical axis of each picture perpendicular to the longitudinal axis of the film, and with each picture being longer in the direction of the length of the film that it is in the direction of the width of the film. In this way, a narrow film can hold two rows of large pictures which can be viewed without excessive enlargement. Second, the drive sprocket holes in the film are placed along the longitudinal axis of the film. In this way, the width of the film is interrupted by only a single row of holes, leaving more of the width of the film to carry the desired rows of pictures.

If the cartridge feed is to be operated simply, then means must be provided to automatically frame the picture and eliminate the need for an unskilled operator to adjust something which he does not [ known ] *know* how to correct. Also, framing means on a projector requires rather complex and expensive structure, and it is desired to eliminate this. In the present invention, only a single sprocket hole is provided per picture and a claw advance is used, the claw advance being directly coordinated with the shutter of the projector. In this way, the claw automatically positions each picture correctly with respect to the shutter and no means are provided for changing this relationship. In contrast, in conventional picture projection, more than one sprocket opening is provided for each picture frame and separate means are provided to synchronize the film advance with the shutter to cause the film to be stopped and the shutter opened only when the picture is properly positioned.

To enable the desired automatic framing, the film is free for lateral movement in the gate to be controlled entirely by the claw advance and the gate floats freely to be positioned by the mechanism which supports the claw so that the gate will accurately position the film with respect to the lens system used and with respect to the level of the claw while leaving the film free to move in all other respects.

Also, in this invention, focus requires little if any adjustment. Indeed, the free floating gate used herein enables the lenses used for projection to be preadjusted prior to sale of the projector and used without further adjustment. Moreover, the focus is not significantly effected by the fact that the image which is projected is differently positioned by the thickness of the film. This further simplifies operation and construction.

The invention includes numerous features which will become more apparent from the description which follows, taken in conjunction with the accompanying drawings in which.

Figure 1:
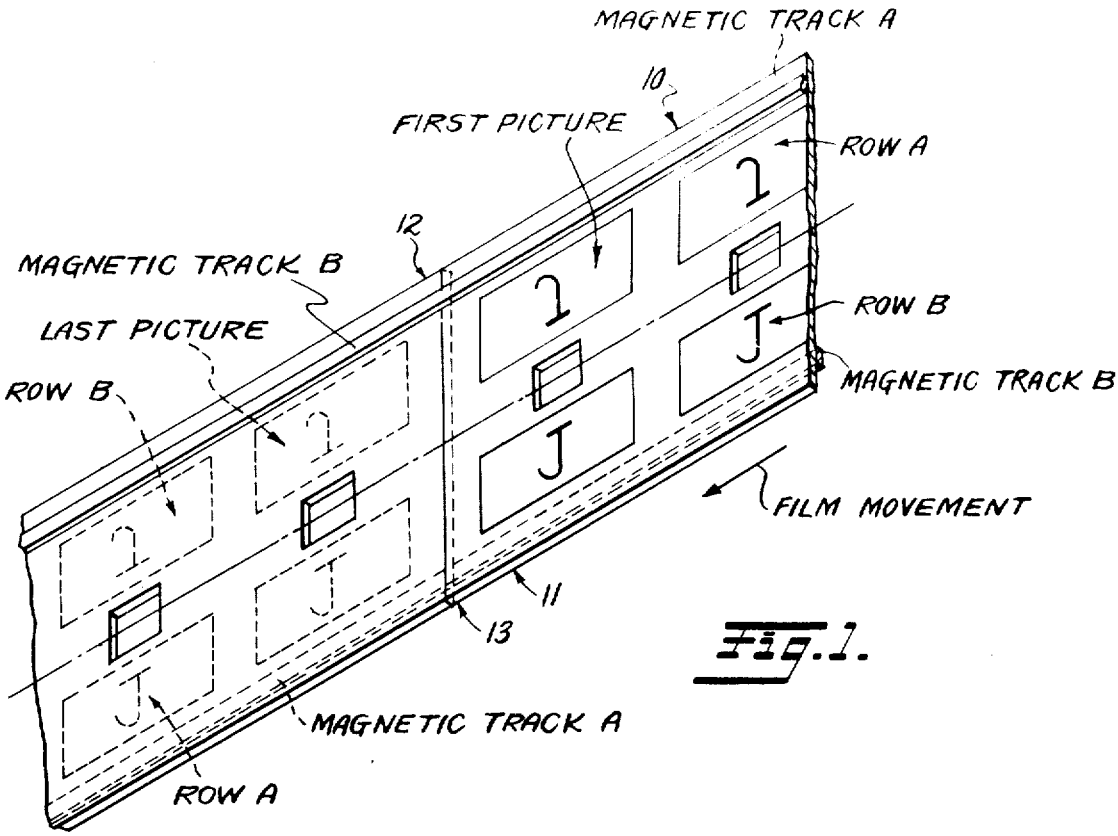
FIG. 1 is a partial perspective view showing the interconnection between opposite ends of an illustrative film constructed in accordance with the invention.

Referring more particularly to the drawings, the film structure used in the invention will be more fully understood from FIG. 1 in which the film identified by numeral 10 has opposite ends 11 and 12 joined together at 13. As will be seen, the end 12 is rotated with respect to end 11 so that the emulsion side of the film on the secured together ends is oppositely disposed at the point of the splice. This involves a rotation of 180° or 540°, etc., as will be apparent.

The emulsion side of the film 10 is formed with two horizontally extending rows of pictures, namely, upper row A and lower row B, these rows being symmetrically positioned with respect to the axis of the film. Each row of pictures is provided with its own associated magnetic sound track, namely, upper magnetic track A and lower magnetic track B. These sound tracks are also symmetrically positioned with respect to the axis of the film. However, one of the sound tracks is on the opposite side of the film, e.g., magnetic track B. As will be more apparent hereinafter, when the continuous film 10 is moved continuously and endlessly in one direction, (see arrow) picture row A will be projected in its entirety from start to finish, followed by picture row B. With continued projection, picture rows A and B will be seen in sequence without end. At the same time, the magnetic sound tracks A and B come together to form a continuous sound track which can be detected with a single magnetic sound pick up.

It will be noted that the pictures in each of rows A and B are placed side-by-side and the vertical axis of each picture is perpendicular to the axis of the film. To identify the orientation of each picture or frame, the letter J is shown for each picture exactly as it would appear on the film. Ordinarily, the projected film is viewed right side up so that the top of the subject in each row of pictures points toward the axis of the film. However, in aircraft for example, the picture would be projected from overhead and, for such upside down projection, the reverse would be true with the top of each picture being on the outside of the film. Nonetheless, the vertical axis will still be disposed as described.

A feature of the invention is the fact that each picture is longer in the direction of the length of the film than it is in the direction of the width of the film. This enables two rows of relatively large pictures to be positioned on a narrow film. However, this would simply require a longer film unless, as in the invention, some way is found to increase the number of rows of pictures which can be present and projected on a continuously moving film with sound tracks effectively accompanying all the rows of pictures.

The invention also employs a symmetrical drive which, in preferred practice, employs a single row of sprocket holes 14 strung out along the axis of the film. One hole 14 is provided for each picture (the pictures in rows A and B are vertically aligned) and this enables automatic framing as will later be described.

It will be understood that only one pair of picture rows A and B with associated magnetic tracks A and B are shown, but there could be several such pairs, depending on the width of the film and the desired picture size.

It will also be noted through the use of dotted lines, that if the film is run endlessly, the emulsion side of the film is oppositely disposed every time the film is run through the projector. It has been found that this minor displacement of the image to be projected by the width of the film does not significantly disturb the focus, though focusing means can be provided on the projector.

Figure 2:
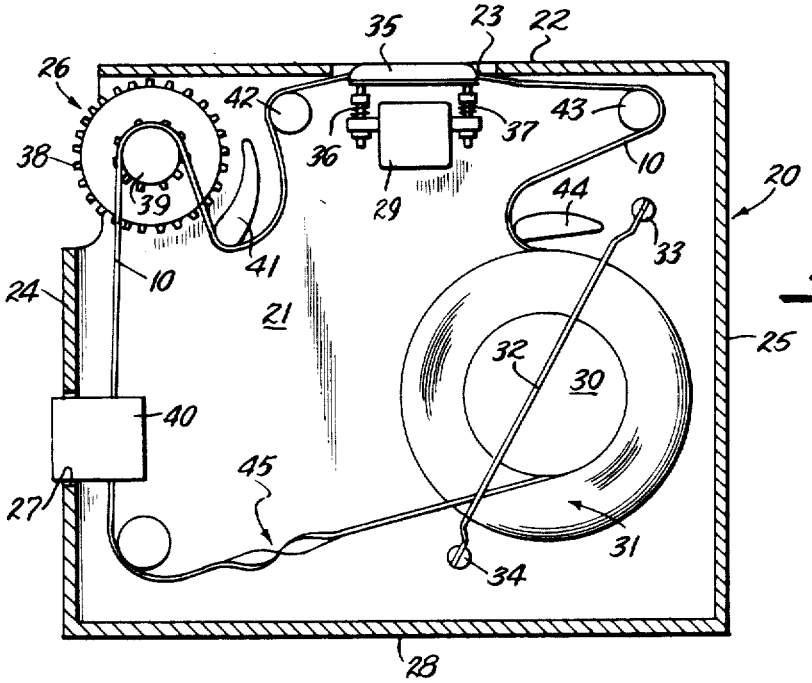
FIG. 2 is a top plan view showing a cartridge constructed in accordance with the invention, but with the top of the cartridge removed to enable the interior structure to be seen.

Referring to FIG. 2, the continuous film with the rotated secured opposite ends shown in FIG. 1 is disposed in a cartridge 20. The cartridge comprises a supporting platform 21, a front wall 22 having a gate-receiving opening 23, and side walls 24 and 25. Walls 22 and 24 and platform 21 are formed with an opening 26 for the drive mechanism and wall 24 has an opening 27 for the sound pick up. The cartridge also has a rear wall 28 and the platform 21 is formed with a mirror opening 29 adjacent the gate opening 23.

Forming part of the platform 21 is a raised core 30 about which the continuous film 10 is reeled, the reel of film being identified at 31. The film in reel 31 is held down by hold down wire 32 fastened by screws 33 and 34. Of course, the top of the cartridge can be used to hold down the reel 31.

The platfrm 21 also carries a gate 35 which is biased forwardly into the gate opening 23 by springs 36 and 37. Platform 21 also supports the drive wheel 38 which, in turn, supports the sprocket drive 39, the magnetic sound pick up structure 40 (details conventional and not shown) and the film guides 41, 42, 43 and 44.

The guides 41 and 44 are special and are configured to contact the film with a tightly curved surface having a radius smaller than the natural curvature of the film. This provides a resilience in operation which takes the place of the conventional loops which are used to enable the film to be moved at a uniform rate except in the film viewing area (which is essential to sound pick up at 40) and to be moved intermittently in the projection area where intermittent movement is essential to the projection of motion pictures.

Following the movement of the film 10 in the cartridge, the film leaves reel 31 when it reaches the core 30 and passes under wire 32. From the wire 32, the film rises (conveniently twists here as shown at 45) and then passes through sound pick up 40. The film is pulled by sprocket drive 39 powered by drive wheel 38 and the film is then pushed past flexing guide 41 and thence past guide 42 to the gate 35. Within the gate, the film is moved intermittently under the control of a claw forming part of the projector. From gate 35, the film proceeds via guide 43 to flexing guide 44 and then to the outside of the reel 31.

Figure 3:
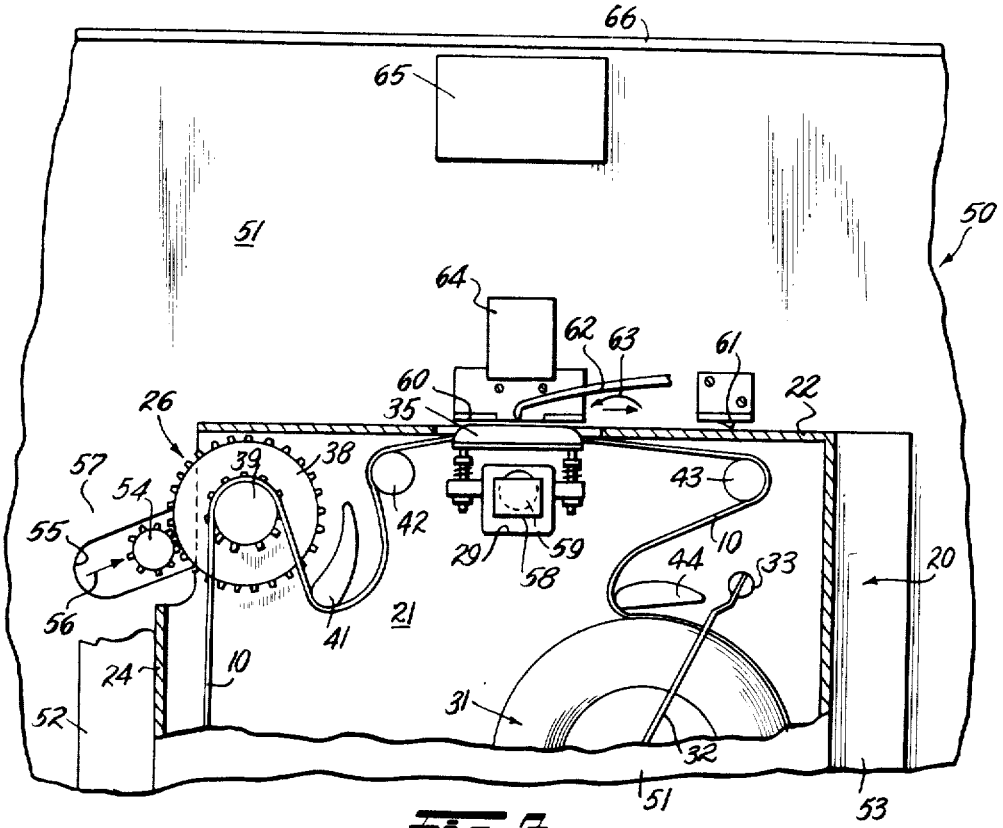
FIG. 3 is a partial plan view showing the cartridge as in FIG. 2 in projecting position in the projector.

In FIG. 3, cartridge 20 is shown inserted into the projector 50 onto a supporting platform 51. Guide rails 52 and 53 are used to guide the cartridge, guide rail 52 terminating short of a drive pinion 54 which extends upwardly through slot 55 in the platform to become engaged with the drive wheel 38 as the cartridge nears the forward end of its insertion stroke. It will be seen that the pinion 54 is spring biased in the direction shown by arrow 56 to bear against drive wheel 38 and it is positioned so that it moves beyond the dead center position 57 of drive wheel 38 when the cartridge is fully inserted.

When the cartridge 20 is fully inserted, the mirror opening 29 overlies a mirror 58 which is pivoted into position and, beneath the mirror 58 is a light source (not shown) and a shutter 59.

Cartridge 20 as it nears the end of its insertion stroke forces gate 35 against abutment 60 which includes means described hereinafter to align the gate 35 and a microswitch 61 is contacted at the point of full insertion to actuate all of the powered mechanisms of the projector. Thus, when microswitch 61 is contacted, it turns on an electric motor (not shown) which drives pinion 54, reciprocates claw 62 as shown by arrows 63, and operates shutter 59. The microswitch also energizes the audio amplifier and lights the lamp 68. The claw 62 is synchronized with the shutter 59 in conventional fashion with the shutter opening at the end of each pulling stroke and closing before the start of the next reaching stroke. No means are provided for varying this synchronization. Means may optionally be provided to vary the length of the stroke of the claw 62.

Figures 4, 5:
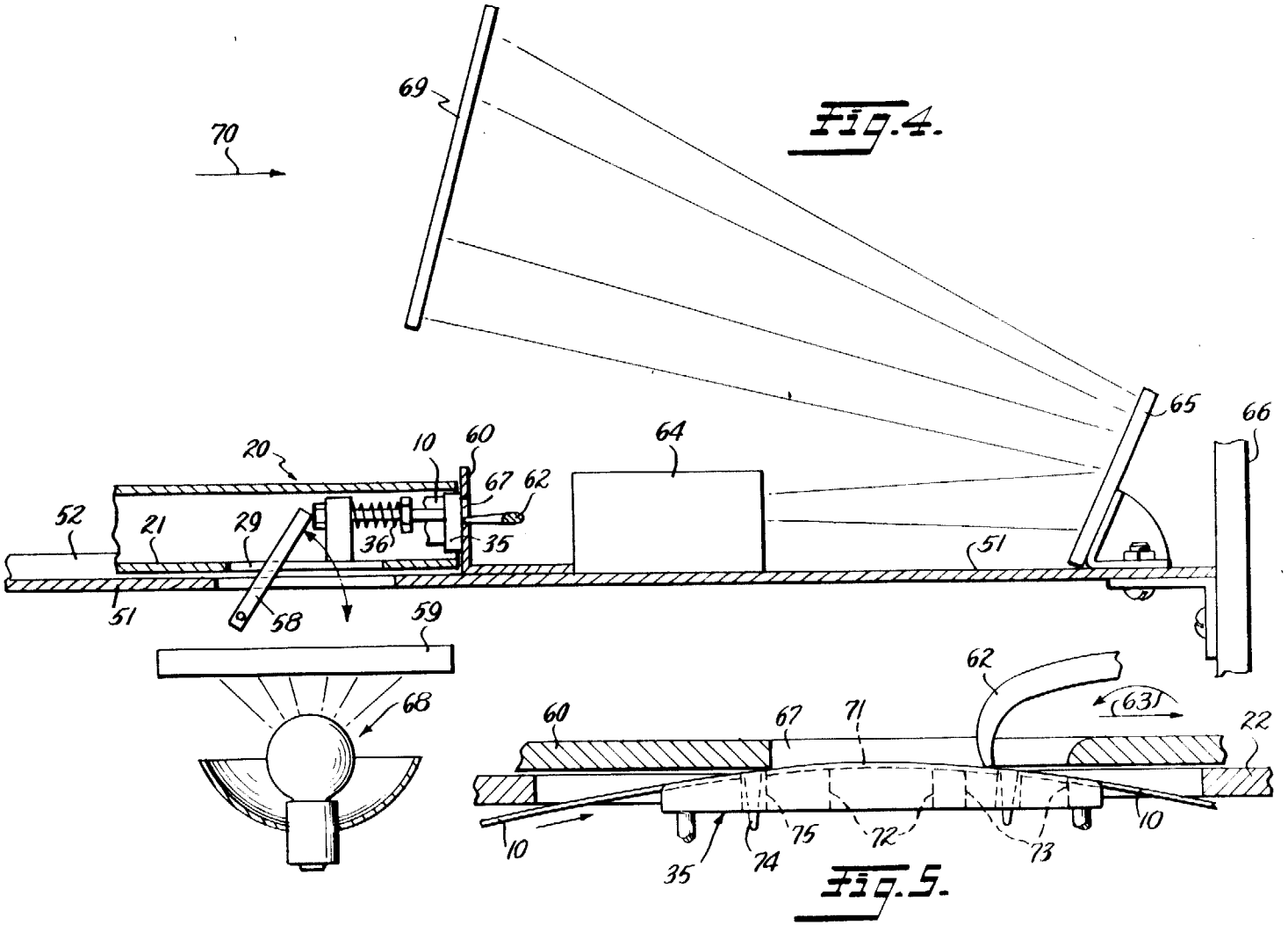
FIG. 4 is a partial sectional elevation showing overall operation and partly diagrammatic.
FIG. 5 is a partial sectional plan view showing the details of the gate and its utilization.

The projection beam in FIG. 3 comes through shutter 59 to strike mirror 58 where it is reflected through the film in gate 35 and the light image so-produced is projected by lenses 64 to a mirror 65 from which it is reflected to a rear projector screen not shown in FIG. 3, but shown diagrammatically in FIG. 4. The rear wall of the projector is identified at 66.

The overall operation can be seen in FIG. 4 where the cartridge 20 in its fully inserted horizontal position is shown resting on platform 51 pressed against abuttment 60 which includes a projection opening 67 through which claw 62 reaches to grasp the sprocket holes in the film 10.

As can be seen in FIG. 4, light from lamp 68 passes through shutter 59 and thence via mirror 58, through the film in gate 35, through opening 67 and through lenses 64. The image reflected from mirror 65 appears on the rear projection screen 69 and can be seen by viewing in the direction of arrow 70.

In FIG. 5, it will be seen that gate 35 is formed with a longitudinal groove 71 within which film 10 slides freely to be moved intermittently by claw 62 in the direction as indicated by the arrow. The motion of the claw is shown by arrows 63. The film is viewed through opening 72 in the gate 35 and the claw 62 engages the sprocket openings in film 10 by extending through a second opening 73 in the gate 35. Pins 74 are carried by abuttment 60 and these enter holes [74] *75* in the gate 35 below the groove 71 in which the film 10 slides.

It will be understood that one cannot know that the film 10 will be in proper framing position, but if it is not, then claw 62 will not grasp the film until it enters one of the sprocket holes at which point intermittent advance of the properly framed film will commence.

Figure 6:
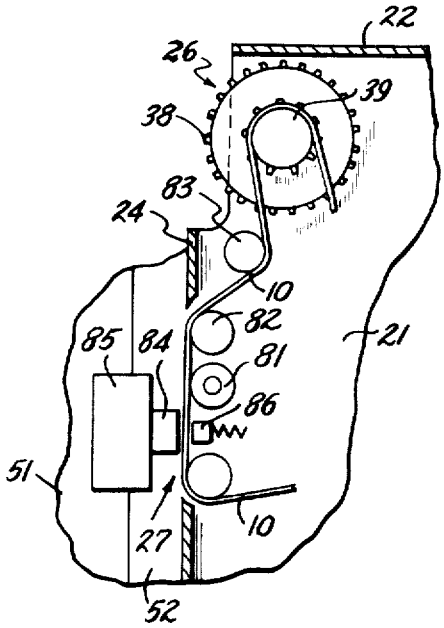
FIG. 6 is a partial plan view of the cartridge and associated projector and illustrating the sound pick-up construction.

Referring more particularly to FIG. 6, the structure used for the sound pick-up and the traverse of the film in the area of the sound pick-up is shown in greater detail.

As can be seen, the film 10 passes guides 80, 81, 82 and 83 on its way to the drive 39. The guide 81 is a roller since this helps to smooth the linear movement of the film past the sound pick-up head 84 which is integral with audio-amplifier 85. Amplifier 85 is carried by the projector on the platform 51.

The film 10 is biased against pick-up head 84 by a spring loaded pressure pad 86.

The invention is defined in the claims which follow.

We claim:

1. In combination: a projector including a projection system comprising a shutter, a claw for advancing film one frame at a time, and a resiliently mounted drive pinion; and a cartridge containing film and having a gate in a front wall of said cartridge for holding said film in a position to be projected and engaged by said claw, said cartridge having an opening positioned at the juncture of said front wall and a side wall of said cartridge and a drive wheel for continuously advancing said film mounted in said opening, said drive wheel and said opening being positioned in said cartridge in the path of said pinion so that said pinion is moved laterally of the path of movement of said drive wheel when said cartridge is inserted in said projector, said pinion being biased toward said drive wheel and positioned to engage said drive wheel when said cartridge is partially inserted into said projector and to maintain contact with said drive wheel until said cartridge is fully inserted at which point said pinion is moved past the dead center position of said drive wheel to resiliently hold said cartridge in place, and said projector including a microswitch which is operated to actuate said projector including said claw and said drive pinion, when said cartridge is fully inserted into said projector.

2. A combination as recited in claim 1 in which said film is in the form of a closed loop mounted for movement continuously and endlessly in one direction.

3. A combination as recited in claim 2 in which the opposite ends of said film are secured to one another with one of said ends being rotated with respect to the other of said ends so that opposite sides of said film will contact said gate on successive passes of said closed loop.

4. A combination as recited in claim 1 in which said drive wheel carries a sprocket drive for carrying said film out of contact with said drive pinion.

5. A combination as recited in claim 1 in which said cartridge includes loop maintaining means on both sides of said gate, each of said means being constituted by a guide around which the film is run, with the portion of the guide around which the film moves having a curvature of smaller radius than the minimum natural turn radius of the film.

6. In combination: a projector including a projection system comprising a shutter, a claw for advancing film one frame at a time, and a resiliently mounted drive pinion; and a cartridge including a front wall and a bottom said cartridge containing film and having a gate in the front wall of said cartridge for holding said film in a position to be projected and engaged by said claw, said cartridge having an opening positioned at the juncture of said front wall and the bottom of said cartridge and a drive wheel for continuously advancing said film mounted in said opening, said drive wheel and said opening being positioned in said cartridge in the path of said pinion so that said pinion is moved laterally of the path of movement of said drive wheel when said cartridge is inserted in said projector, said pinion being biased toward said drive wheel and positioned to engage said drive wheel when said cartridge is partially inserted into said projector and to maintain contact with said drive wheel until said cartridge is fully inserted at which point said pinion is moved past the dead center position of said drive wheel to resiliently hold said cartridge in place, and said projector including a microswitch which is operated to actuate said projector, including said claw and said drive pinion, when said cartridge is fully inserted into said projector.

7. A combination as recited in claim 6 in which said film is in the form of a closed loop mounted for movement continuously and endlessly in one direction.

8. A combination as recited in claim 7 in which the opposite ends of said film are secured to one another with one of said ends being rotated with respect to the other of said ends so that opposite sides of said film will contact said gate on successive passes of said closed loop.

9. A combination as recited in claim 6 in which said drive wheel carries a sprocket drive for carrying said film out of contact with said drive pinion.

10. A combination as recited in claim 6 in which said cartridge includes loop maintaining means on both sides of said gate, each of said means being constituted by a guide around which the film is run, with the portion of the guide around which the film moves having a curvature of smaller radius than the minimum natural turn radius of the film.

* * * * *

UNITED STATES PATENT OFFICE

CERTIFICATE OF CORRECTION

PATENT NO. : Reissue 28,504

DATED : August 5, 1975

INVENTOR(S) : Peter J. Castellano and Jerry H. Galuten

It is certified that error appears in the above-identified patent and that said Letters Patent are hereby corrected as shown below:

Column 6, claims 6, 7, 8, 9 and 10, should have been printed using italic type to show that these are reissue claims.

Signed and Sealed this

*second* Day of *December 1975*

[SEAL]

*Attest:*

RUTH C. MASON
*Attesting Officer*

C. MARSHALL DANN
*Commissioner of Patents and Trademarks*